United States Patent Office 3,529,998
Patented Sept. 22, 1970

3,529,998
PICKLING PROCESS
Fritz Singer, Starnberg, Upper Bavaria, Germany, assignor of one-half to Tadeusz Sendzimir, Waterbury, Conn.
No Drawing. Filed Feb. 13, 1967, Ser. No. 615,394
Claims priority, application Germany, Feb. 16, 1966, 1,621,646
Int. Cl. C23g 1/24
U.S. Cl. 134—1                                    5 Claims

ABSTRACT OF THE DISCLOSURE

A method of rapidly removing scale from the surfaces of ferrous articles with ammonium salt solutions, the articles being treated at several degrees Centigrade below the boiling point of the ammonium salt solution in an open vessel, and precipitating ferric hydroxide out of the ferrous-ammonium salt solution formed during the process by oxidation of the ferrous-ammonium salt through contact with the atmosphere. Water-soluble alkaline earth metal salts and/or water-soluble zinc or cadmium salts added to the ammonium salt pickling solution minimize ammonia losses. The air blanket above the pickling bath is continuously regenerated by a hollow frame positioned a short distance above the bath surface, the lower wall of the frame having uniformly distributed perforations and the upper wall having a connection to a pressured air system. The method may also advantageously be combined with ultrasonic systems for scale removal.

---

This invention relates to a method of removing the scale formed on iron and steel articles resulting from prior heat treatment, which at the present time is removed by treating the articles with hot mineral acids. The advantage of this method consists in that the descaling requires comparatively short time and descaling apparatuses thus render possible large throughputs. In order to increase such throughputs acid concentrations and pickling temperatures have more recently been essentially increased while tolerating a diminution of the corrosion resistance. The main disadvantage of this known method consists in that the spent pickling acids have to be concentrated in order to separate the ferrous salts, requiring high investment costs, energy consumption and working cost. As there is no market for disposing of the large quantities of the ferrous salts they have to be transformed into iron oxide and mineral acid by a very expensive process which is economical only on the basis of a free of charge delivery of the iron salts to the factory undertaking the transformation of the iron salts into ferric oxide and mineral acid.

Mechanical descaling whereby the brittle scale is removed by bending, stretching, tumbling or blasting with granulated hard materials has not replaced acid pickling since it has proved either deficient or too expensive.

By chemical descaling (as disclosed in German Pats. 1,104,285 and 1,108,538) with boiling solutions, neutral ammonium salts of strong acids in which the ammonia partly liberated by the decomposition of the iron complex formed during the pickling action is retained in the reaction cycle and the dissolved iron is precipitated out of the iron-ammonia complex by introducing air as ferric hydroxide whereby the spent ammonium salt is regenerated, an important step has been made towards the solution of the problem to obtain a complete descaling, without any loss of chemicals, in a simple process permitting of the complete regeneration of the ammonium salt and the isolation of the dissolved iron as ferric hydroxide.

A disadvantage of the known ammonium salt pickling method consists in that the ammonia partly liberated during the pickling operation has to be retained in the reaction cycle, thus requiring performing the process in a closed container and absorbing the liberated ammonia in water. A further disadvantage of the known method consists in that, due to the lesser aggressiveness of the ammonium salt, it requires a substantially longer pickling time than modern, higher temperature, mineral acid pickling.

I have now discovered that the ammonium salt descaling process can be performed in an open vessel without losses of ammonia by treating the articles to be descaled at temperatures lying some or several degrees centigrade below the boiling point of the respective ammonium salt solutions and simultaneously maintaining a constantly regenerated air cushion above the bath surface, the iron of the iron (II) ammonium salt formed during the descaling operation being precipitated as ferric hydroxide by the oxygen of the air cushion or blanket.

In the process according to the invention the iron hydroxide is precipitated, not as hitherto, after the bath is exhausted and adding the ammonia separately collected but already in the beginning of the pickling operation and nearly instantly following the formation of the iron (II) ammonium salt.

As the composition of the ammonium salt solution is not altered during the pickling operation it can be used until the iron hydroxide content has enriched in the bath to such an extent as to make it necessary to isolate it by centrifuging or any other filtering method.

It has to be expected that any essential reduction of the reaction temperature would result in an essential increase of the pickling time. This is not the case. On the contrary, the pickling time is reduced in a surprising manner. An explanation of this puzzling statement may be that the steam vapors constantly formed on the surface of the articles at the boiling temperature prevent the articles from being in constant contact with the ammonium salt solution.

A further object of the invention is the provision of apparatus for constantly regenerating the air blanket above the surface of the pickling bath. This device consists of a hollow frame arranged a short distance from the bath surface the lower wall of which hollow frame is provided with uniformly distributed perforations while the upper wall thereof is connected by a pipe system with a pressure air source. Spent air and water vapors are allowed to escape through the gap formed between the pickling bath wall and hollow frame.

EXAMPLE 1

Low carbon steel sheets are treated in an open tank covered with the aforesaid hollow frame for regenerating the air cushion in a solution of:

| | Parts by wt. |
|---|---|
| Ammonium chloride | 10 |
| Water | 30 |

10 to 15 minutes at 90 to 95° C., while constantly restoring the air blanket on the bath surface. The sheets are free of scale and of silvery appearance.

When treating the same sheets in the same solution at or nearly at the boiling point the sheets, after 20 minutes, are only partly descaled.

A striking advantage of the present invention is the extremely small formation of hydrogen compared with that formed in mineral acid pickling which small formation of hydrogen results in an equally small formation of iron hydroxide.

Applicant's ammonium salt descaling process consists in mainly dissolving the ferrous oxide and in less dissolving of the metal base. In applicant's process the iron (II–III) oxide coating is not split off thereby forming coarse particles but is finely divided and slightly adhering to the metal surface.

Since the path is kept practically free of iron salts during the pickling operation, the washing of the pickled articles and the filtered iron hydroxide may be performed in known manner without infringing the water laws. As however, a complete recovery of the ammonium salts cannot be foregone for economic reasons, the concentrating of the rinsing waters can be avoided by making use of the methods and apparatuses according to the German Pats. 1,140,667; 151,508 and 142,742 which permit of recovering the ammonium salts as concentrated solutions which can be immediately added to the pickling bath.

In order to exclude even the smallest losses of ammonia according to the invention water-soluble salts of bivalent metals are added to the ammonium salt solution which metals are capable of binding ammonia as metal ammonia salts. Particularly adapted for this purpose are the water-soluble salts of alkaline earth metals, particularly calcium chloride.

EXAMPLE 2

|  | Parts by wt. |
| --- | --- |
| Ammonium chloride | 10 |
| $CaCl_2 \cdot 6H_2O$ or $MgSO_4 \cdot 7H_2O$ | 1–2 |
| Water | 30 |

Soft steel sheets are treated 10–15 minutes at 90 to 95° C. Apart from a very small formation of hydrogen the instant action of the air is very remarkable. A sample of the bath fluid adhering to a glass rod is instantaneously overcoated with a film of iron hydroxide.

I have further discovered that the aggressiveness of the ammonium salt solution is considerably increased and the pickling time can be considerably reduced by adding to the ammonium salt solution such salts of bivalent metals as are capable of a self-pickling action as, for instance, the salts of zinc and cadmium Other additives which have been found beneficial are the water-soluble salts of the earth alkaline metals. Additionally, a salt selected from the following may be used: magnesium sulfate, cadmium chloride, zinc sulfate.

EXAMPLE 3

|  | Parts by wt. |
| --- | --- |
| Ammonium chloride | 5 |
| Any one of the following:<br>Zinc chloride<br>Zinc sulfate<br>Cadmium chloride | 1–3 |
| Water | 30 |

The articles to be descaled are treated 10 minutes at 95° C.

The composition of the pickling bath can be modified within wide limits. By the addition of calcium chloride to such solutions as do not contain sulfates, an extremely smooth precipitation of the iron hydroxide can be obtained.

EXAMPLE 4

|  | Parts by wt. |
| --- | --- |
| Ammonium chloride | 5 |
| Dry zinc chloride | 5 |
| Water | 30 |

Soft steel sheets are treated in this solution 5 to 10 minutes. By adding to this solution 1 to 2 parts by weight of calcium chloride the iron hydroxide is precipitated in form of the red α modification which permits very easy centrifuging and can be used as red dyestuff.

In order to avoid iron losses modern steel works already make use of mechanical descaling processes like bending by means of which the thick and tight scale is at least broken off or split off.

When using mechanical descaling devices which can successfully be combined with the apparatuses according to the invention, especially in accordance with Example 4, sufficiently short descaling times can be obtained without using ultrasonics.

I have further discovered that a reduction of the descaling time matching the present high requirements of industry and simultaneously rendering possible lowest losses of iron can be obtained by treating the articles with ammonium salt solutions, in installations which contain the ultrasonic equipment whereby the ammonium salt solution is used as coupling fluid.

It has already been proposed to treat the articles in conventional mineral acid pickling with ultrasonics. As in the meantime shortest pickling times have been obtained by increasing acid concentrations and pickling temperatures, the use of ultrasonics would only require additional investment cost and energy without offering any advantages.

In the process according to the invention where pickling agents of essentially lesser aggressiveness are used the mechanical impact action of ultrasonics comes to full effect. When having the ultrasonic waves acting parallel to the surface of a sheet it can be observed that the scale particles are swept away. In the practical use of ultrasonics where the ultrasonic waves are acting vertically or radially to the surface of the articles their particular effect consists in smoothly removing scale particles strongly adhering in cavities of the metal surface. A further advantage of using supersonics consists in that pickling times of less than 5 minutes can be obtained at temperatures of about 90° C.

By the present invention the drawbacks of the hitherto known ammonium salt pickling can be avoided. Ammonium salt pickling can now be performed in open pickling tanks without ammonia losses thus rendering possible the use of existing mineral acid pickling apparatuses. As the iron (II) salt forming during the pickling operation is continually precipitated, the solutions can be kept continuously free of iron salts. As the ammonium salt solution is continuously regenerated during the pickling operation, there are no losses of chemicals and the expensive isolation of iron salts such as are necessary in conventional mineral acid pickling can be disposed of. As the remarkably small formation of hydrogen indicates, the iron losses are extremely small compared with those formed in mineral acid pickling. The iron hydroxide occurring in the red α modification can be used as iron red dyestuff.

The embodiments of the invention in which an exclusive property or privilege is claimed are defined as follows:

1. A process for the removal of oxide scale on ferrous articles, comprising the steps of immersing said articles in a receptacle containing a solution of ammonium pickling salt, maintaining said solution at an elevated temperature below the boiling point thereof, and providing a forced air current adjacent to the surface of the bath, said air current separating said solution from the atmosphere, whereby said air current provides oxygen for the precipitation of iron hydroxide out of the iron (II) ammonium salt formed during said oxide scale removing process.

2. The process according to claim 1 wherein said solution is limited to the temperature at which ammonia begins to appear in the vapors from said solution.

3. The process according to claim 1 wherein calcium chloride is added to said ammonium pickling salt solution.

4. The process according to claim 1 wherein a salt selected from the group consisting of zinc chloride, zinc sulfate and cadmium chloride is added to said ammonium pickling salt solution.

5. The process according to claim 1, including the steps of subjecting said ammonium pickling salt solution to ultrasonics.

(References on following page)

References Cited

UNITED STATES PATENTS

| 1,269,443 | 6/1918 | Hoffman | 134—13 |
| 2,700,004 | 1/1955 | Miller | 134—13 |
| 3,066,084 | 11/1962 | Osterman | 134—15 XR |

FOREIGN PATENTS 1,104,285  4/1961  Germany.

OTHER REFERENCES

"Calculations of Analytical Chemistry," L. F. Hamilton and S. G. Simpson, 4th ed., 1947, pp. 52, 53.

MORRIS O. WOLK, Primary Examiner

D. G. MILLMAN, Assistant Examiner

U.S. Cl. X.R.

134—2, 13; 252—86